United States Patent
Hignight et al.

(10) Patent No.: US 10,774,013 B2
(45) Date of Patent: Sep. 15, 2020

(54) MULCH PRODUCT

(71) Applicant: Central Garden & Pet Company, Walnut Creek, CA (US)

(72) Inventors: Kenneth Hignight, Albany, OR (US); Debra Hignight, Albany, OR (US)

(73) Assignee: Central Garden & Pet Company, Walnut Creek, CA (US)

( * ) Notice: Subject to any disclaimer, the term of this patent is extended or adjusted under 35 U.S.C. 154(b) by 318 days.

(21) Appl. No.: 15/405,620

(22) Filed: Jan. 13, 2017

(65) Prior Publication Data

US 2017/0204018 A1    Jul. 20, 2017

Related U.S. Application Data

(60) Provisional application No. 62/388,178, filed on Jan. 19, 2016.

(51) Int. Cl.
| | | |
|---|---|---|
| *A01G 13/02* | (2006.01) | |
| *C05F 11/00* | (2006.01) | |
| *A01C 21/00* | (2006.01) | |
| *B27L 11/06* | (2006.01) | |

(52) U.S. Cl.
CPC ............ *C05F 11/00* (2013.01); *A01C 21/005* (2013.01); *A01G 13/0262* (2013.01); *B27L 11/06* (2013.01); *A01C 21/00* (2013.01); *Y02A 40/284* (2018.01)

(58) Field of Classification Search
CPC ............ A01G 13/0262; A01G 13/0256; A01G 9/0293; A01G 9/0299
See application file for complete search history.

(56) References Cited

U.S. PATENT DOCUMENTS

| | | | |
|---|---|---|---|
| 4,297,810 A | | 11/1981 | Hansford |
| 4,369,597 A | | 1/1983 | Leep et al. |
| 5,044,324 A | * | 9/1991 | Morgan ............... A01K 1/0152 119/171 |
| 5,301,460 A | | 4/1994 | Corbitt |
| 5,389,116 A | * | 2/1995 | Byrd .................. A01G 13/0262 47/9 |
| 5,456,733 A | * | 10/1995 | Hamilton, Jr. .......... C05F 11/00 47/9 |
| 5,585,150 A | | 12/1996 | Sheehan |
| 5,653,053 A | | 8/1997 | Handley |
| 5,672,434 A | | 9/1997 | Dalebroux et al. |
| 5,741,832 A | | 4/1998 | Spittle |
| 5,779,782 A | | 7/1998 | Spittle |

(Continued)

FOREIGN PATENT DOCUMENTS

DE         3431565 A1    3/1985

*Primary Examiner* — Kristen C Hayes
(74) *Attorney, Agent, or Firm* — Womble Bond Dickinson (US) LLP

(57) ABSTRACT

Methods and processes for producing mulch products are disclosed. A mulch product that includes a fertilizer, at least one seed, and a mulch, and methods and processes for producing mulch products are detailed. The mulch includes wood pellets formed from processed raw sawdust that has been ground. The ground sawdust is formed into pellets, such as by compression. The pellets are then crumbled to form the wood pellets to have a substantially regular outer surface that minimizes engagement with the at least one seed.

17 Claims, 13 Drawing Sheets
(5 of 13 Drawing Sheet(s) Filed in Color)

(56) References Cited

U.S. PATENT DOCUMENTS

| | | | |
|---|---|---|---|
| 5,916,027 A * | 6/1999 | Spittle | A01G 13/0262 47/9 |
| 6,076,299 A * | 6/2000 | Spittle | C09K 17/52 47/9 |
| 6,158,167 A | 12/2000 | Spittle | |
| 6,209,259 B1 | 4/2001 | Madigan et al. | |
| 6,349,499 B1 | 2/2002 | Spittle | |
| 6,360,478 B1 | 3/2002 | Spittle | |
| 6,688,038 B1 | 2/2004 | Paternoster et al. | |
| 6,745,513 B2 | 6/2004 | Krysiak et al. | |
| 7,412,878 B2 | 8/2008 | Krysiak et al. | |
| 7,752,804 B2 | 7/2010 | Spittle et al. | |
| 7,854,926 B2 | 12/2010 | Spittle | |
| 8,256,158 B2 | 9/2012 | Spittle et al. | |
| 8,474,183 B2 | 7/2013 | Krysiak et al. | |
| 8,870,996 B2 | 10/2014 | Cannock | |
| 2002/0078623 A1 * | 6/2002 | Raddon | C10L 5/44 44/590 |
| 2002/0129545 A1 * | 9/2002 | Morris | A01G 13/0262 47/9 |
| 2009/0265979 A1 * | 10/2009 | Spittle | A01G 13/0262 47/9 |
| 2011/0210469 A1 * | 9/2011 | Keller | B29B 17/0036 264/140 |
| 2011/0232173 A1 * | 9/2011 | Lefebvre | A01G 13/0262 47/9 |
| 2011/0247273 A1 | 10/2011 | Cannock | |
| 2011/0247379 A1 | 10/2011 | Cannock | |
| 2011/0247536 A1 | 10/2011 | Cannock | |
| 2011/0250018 A1 | 10/2011 | Cannock | |
| 2018/0057966 A1 * | 3/2018 | Spittle | D01G 9/06 |
| 2018/0070528 A1 * | 3/2018 | Richman | A01G 9/0293 |
| 2018/0077853 A1 * | 3/2018 | Dashiell | C09K 17/52 |

* cited by examiner

US 10,774,013 B2

MULCH PRODUCT

CROSS-REFERENCE TO RELATED APPLICATION

The present application claims the benefit of U.S. Provisional Patent Application No. 62/388,178, filed on Jan. 19, 2016.

INCORPORATION BY REFERENCE

The disclosure of U.S. Provisional Patent Application No. 62/388,178, filed on Jan. 19, 2016, is incorporated by reference herein for all purposes as if presented herein in its entirety.

FIELD OF THE DISCLOSURE

This disclosure relates to mulch products and, more particularly, to mulch products containing crumbled pellets.

SUMMARY

One aspect of this disclosure is the provision of a wood-based, crumbled mulch product that includes several unique features, including, for example, a mulch that enhances contact between one or more seeds and soil by swelling in a controlled manner. In this regard, the inventive mulch can increase in size to overlie seed in the mulch product, and, instead of lifting the seed as in comparative mulches, not interfere with seeds contacting the soil.

According to one aspect of the disclosure, a mulch product is disclosed that comprises a fertilizer, at least one seed, and a mulch. The mulch comprises a plurality of formed, crumbled wood pellets each having a substantially regular outer surface that minimizes engagement with the seed.

According to another aspect of the disclosure, a method of producing a mulch product is disclosed, and comprises obtaining ground sawdust, forming pellets from the ground sawdust, crumbling the pellets into a mulch, and mixing the mulch with at least one seed and a fertilizer. The pellets are crumbled to have a substantially regular outer surface.

According to another aspect of the disclosure, a mulch product is formed by the process of obtaining ground sawdust, forming pellets from the ground sawdust, and crumbling the pellets into a mulch. The crumbled pellets have a substantially regular outer surface.

In another aspect, the present disclosure also includes a process of producing a mulch pellet. The pellet can be formed, for example, by direct pressure and crumbling, or by other methods.

Those skilled in the art will appreciate various advantages and benefits of various embodiments of the present invention upon reading the following detailed description of the embodiments with reference to the below-listed drawings.

BRIEF DESCRIPTION OF THE DRAWINGS

This patent or application file contains at least one drawing executed in color. Copies of the patent or patent application publication with color drawing(s) will be provided by the Office upon request and payment of the necessary fee.

Having described some aspects of this disclosure in general terms, reference will now be made to the accompanying drawings, which are not necessarily drawn to scale. The drawings are exemplary only, and should not be construed as limiting.

DETAILED DESCRIPTION

Exemplary embodiments are described below and illustrated in the accompanying drawings, in which like numerals refer to like parts throughout the several views. The embodiments described provide examples and should not be interpreted as limiting. Other embodiments, and modifications and improvements of the described embodiments will occur to those skilled in the art and all such other embodiments, modifications and improvements are within the scope of the present disclosure. For example, features illustrated or described as part of one embodiment can be used in the context of another embodiment to yield a further embodiment, and these further embodiments are within the scope of the present disclosure.

As described herein, in one aspect, a mulch product is disclosed that includes crumbled wood pellets and that provides superior fluid-retention and expansion properties while promoting contact of seeds within the mulch product with soil, as compared to comparative mulch product components. Seed/soil contact is essential for good germination and establishment of grass seeds.

As also described herein, in another aspect, a process of producing a mulch product according to an exemplary embodiment described herein is shown in progression through FIG. 1A-FIG. 1E and FIG. 2.

Figure 1A:
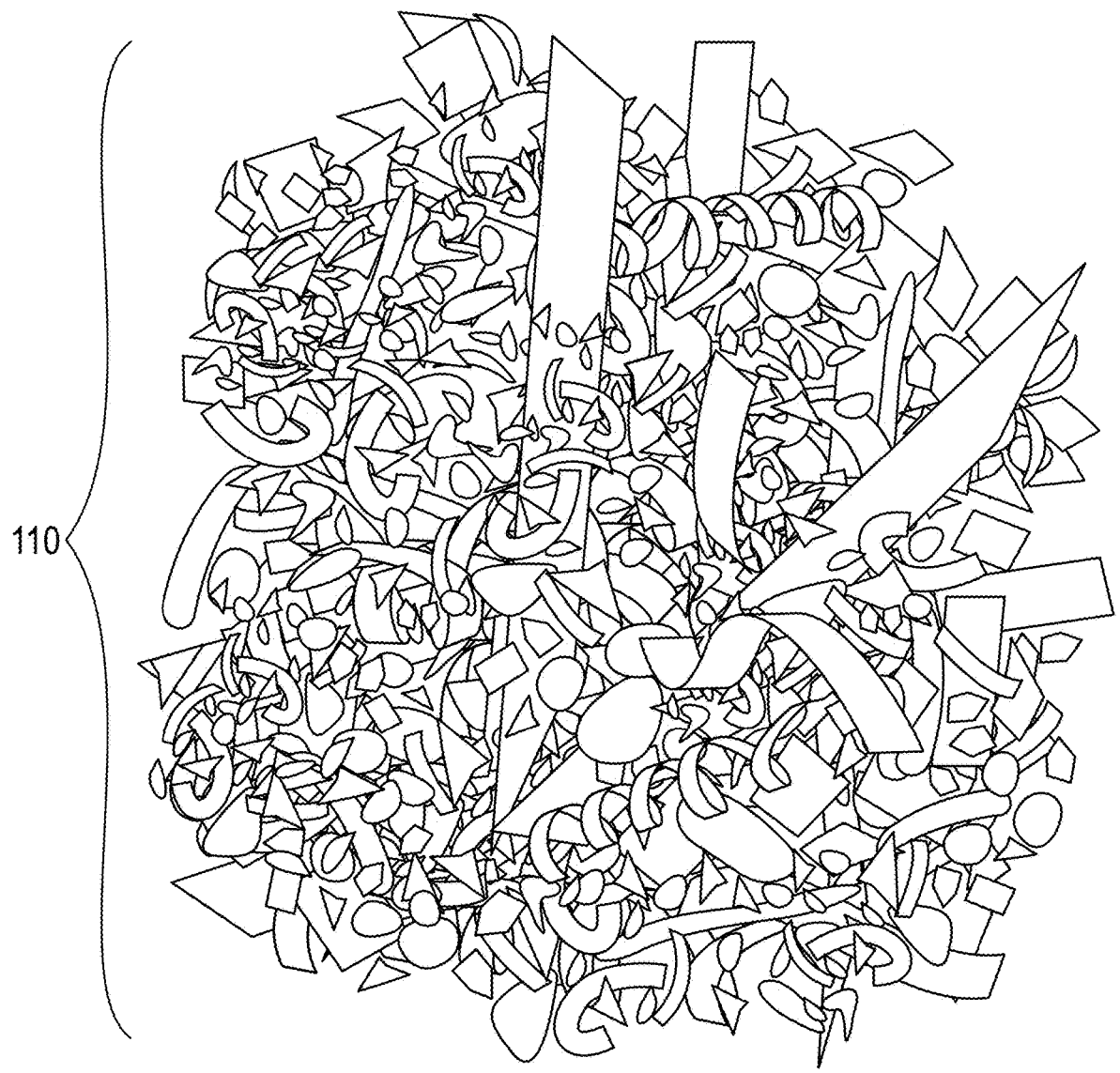
FIG. 1A is a top plan view of raw sawdust for use in a mulch product.

FIG. 1A shows a top plan view of a region of relatively raw sawdust generally indicated at 110. The relatively raw sawdust 110 may be an aggregate of individual components, for example, chips, chunks, slivers, and/or shavings of composite material (e.g., wood), of varying configurations and sizes. In embodiments, individual components of raw sawdust 110 may be provided at lengths of, for example, up to 2 inches. Such raw sawdust 110 may be obtained from various sources of wood, as indicated in step S101 of FIG. 2. In the illustrated embodiment, raw sawdust 110 may be obtained from, for example, a hardwood species of wood. In embodiments, raw sawdust 110 may be obtained from, for example, hickory, maple, oak, beech, birch, ash, walnut, cherry, hackberry, gum, elm, sycamore, alder, poplar, cottonwood, basswood, or aspen wood sources. The raw sawdust 110 could also be obtained from soft woods or medium hard wood, or can be combinations from wood with disparate hardnesses.

Figure 1B:
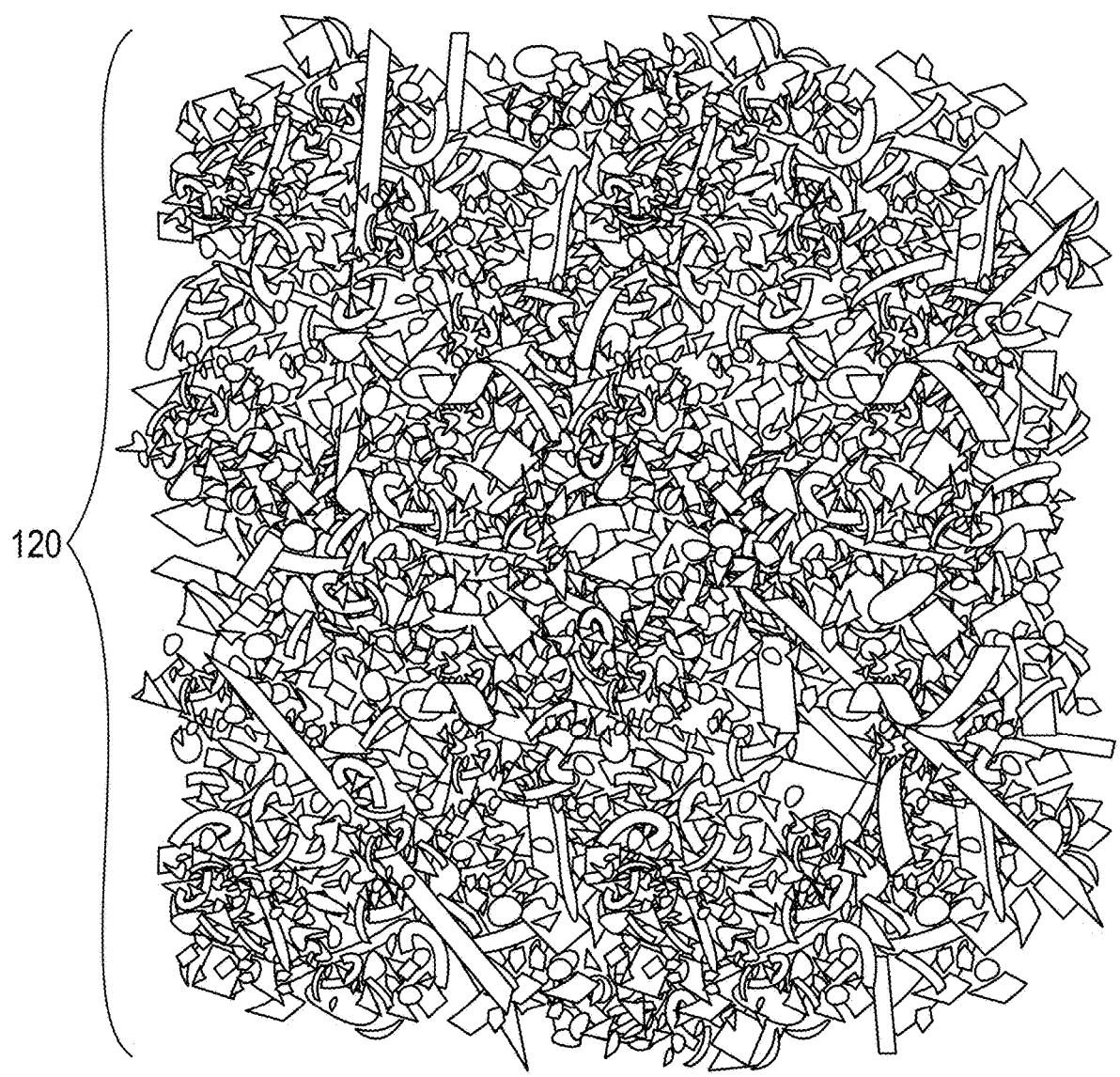
FIG. 1B is a top plan view of ground sawdust formed from the raw sawdust of FIG. 1A.
Figure 2:
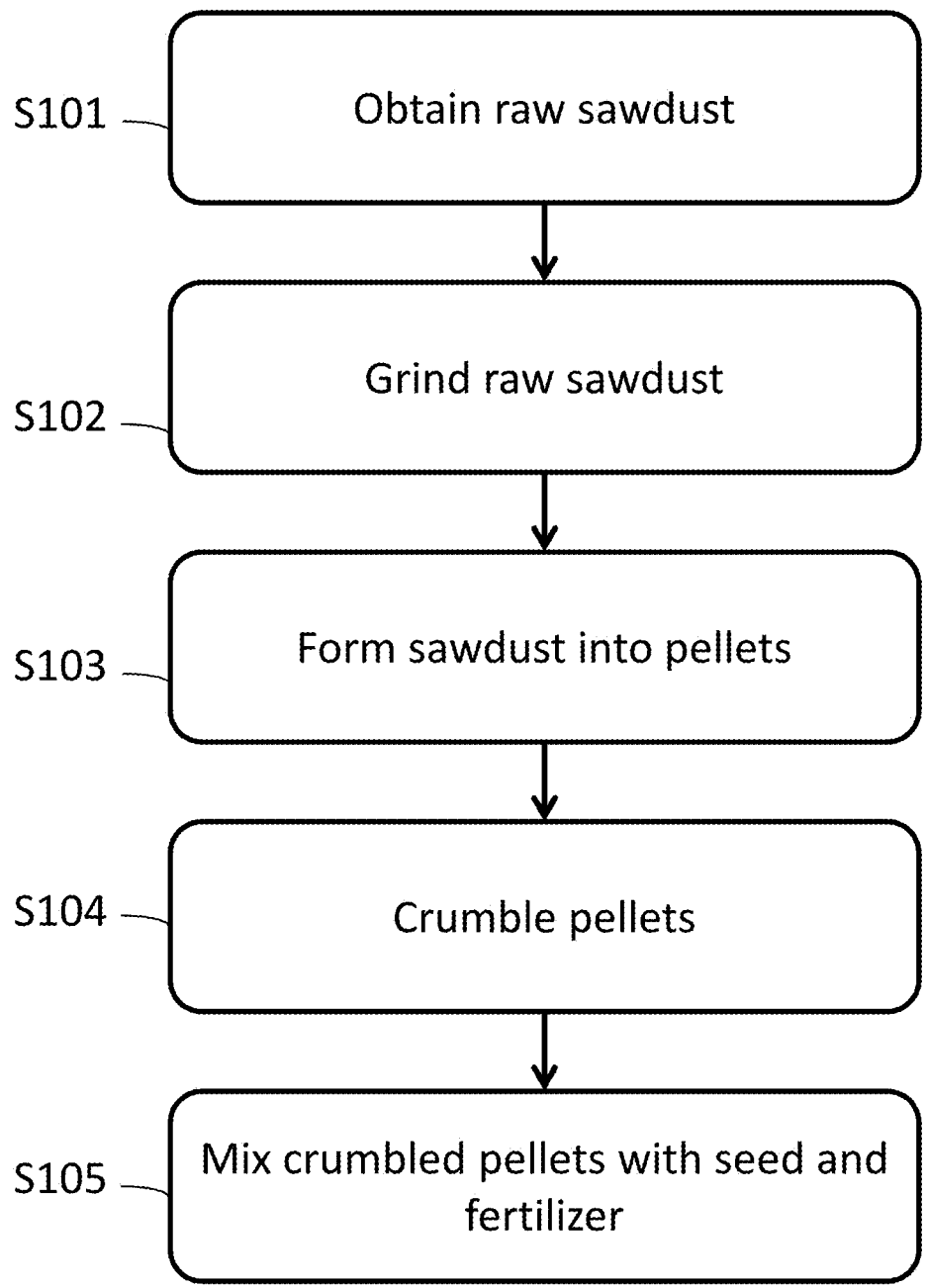
FIG. 2 is a process flow illustrating a process for forming the mulch product of FIG. 1E.

FIG. 1B shows a top plan view of a region of ground or relatively ground sawdust, generally indicated at 120, that can be formed, in one example, by grinding the raw sawdust 110 of FIG. 1A, and as indicated in step S102 of FIG. 2. For example, the ground sawdust 120 may be an aggregate formed of the ground individual components of raw sawdust 110, as described above. In embodiments, ground sawdust 120 may be produced by processing raw sawdust 110 through a mill or grinder, with one exemplary product being a series 5 hammer mill (and is available from Andritz Feed & Biofuel A/S of Esbjerg, Denmark). Raw sawdust 110 may also be passed through a screen, with one exemplary screen being a ¼ inch screen, in producing ground sawdust 120. In embodiments, different milling or grinding processes and/or screen sizes may be used in producing ground sawdust 120.

Figure 1C:
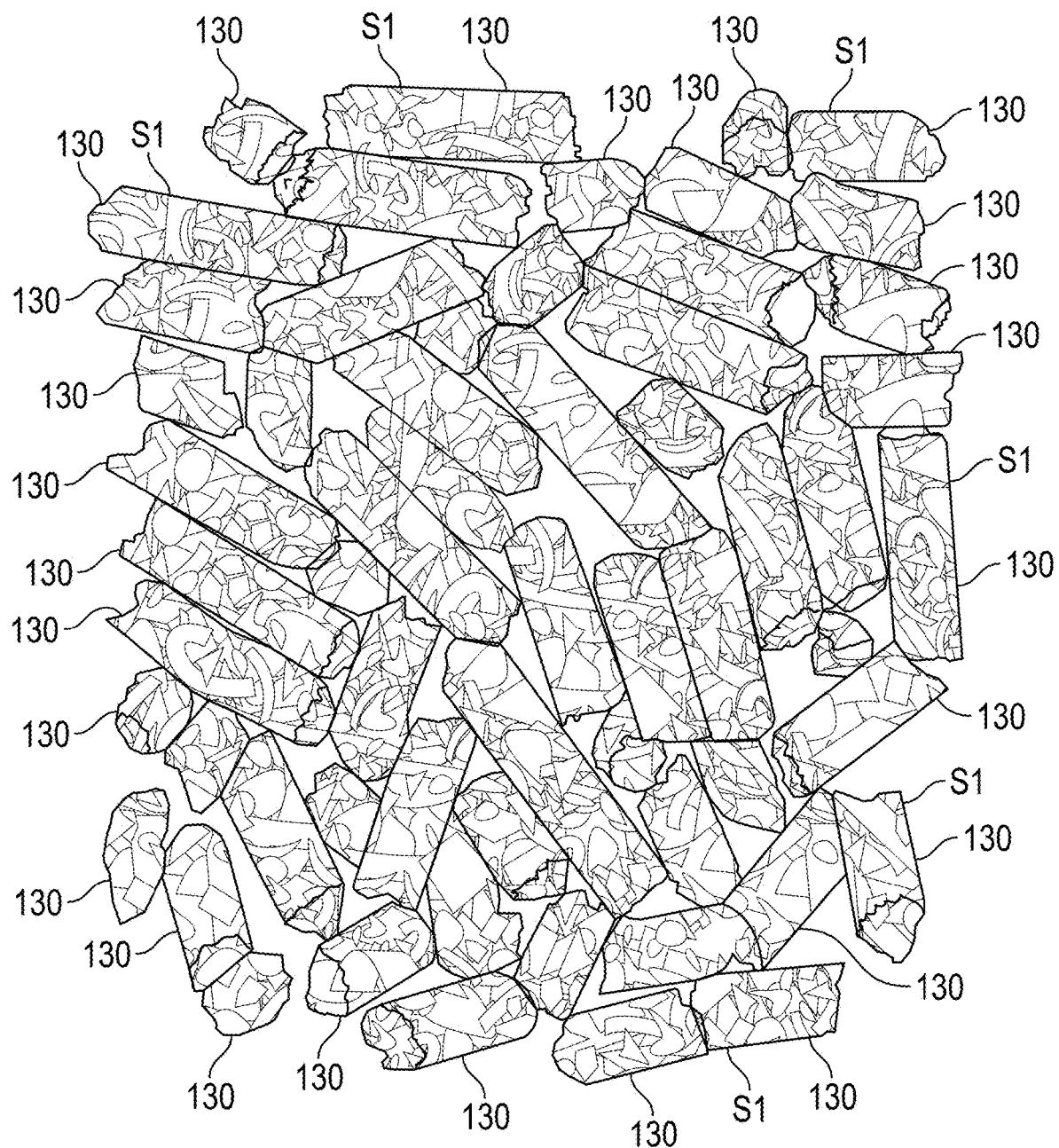
FIG. 1C is a top plan view of pellets formed from the ground sawdust of FIG. 1B.

Referring to FIG. 1C, the ground sawdust 120 shown in FIG. 1B is formed into pellets 130 as indicated in step S103 in FIG. 2. In embodiments, ground sawdust 120 may be formed, for example, by compressing the ground sawdust 120 through the application of direct pressure or another process, and such process may incorporate the use of one or more dies and/or presses (for example, a hydraulic press or screw press). The resulting pellets 130 may be relatively large in size, and are formed such that the pellets 130 have a substantially regular, e.g., smooth, even, uniform, and/or unvarying, outer surface. While several pellets 130 are indicated and identified in FIG. 1C, it will be understood that, in embodiments, different numbers of pellets 130 may be provided in different configurations and/or sizes. In embodiments, pellets 130 may be produced from ground sawdust 120 with a pellet mill, with one exemplary product being an Andritz Sprout Model 26LM 11 pellet mill (and is available from Andritz Feed & Biofuel A/S of Esbjerg, Denmark) having a ¼ inch hole die with a 1.496 inch effective length and a 1.456 inch relief length hole, a total die hole chamfer of 60 degrees (30 degrees on each side), a die thickness of 2.95 inches, and which uses corrugated rolls. In embodiments, a different apparatus may be used in producing pellets 130.

Figure 1D:
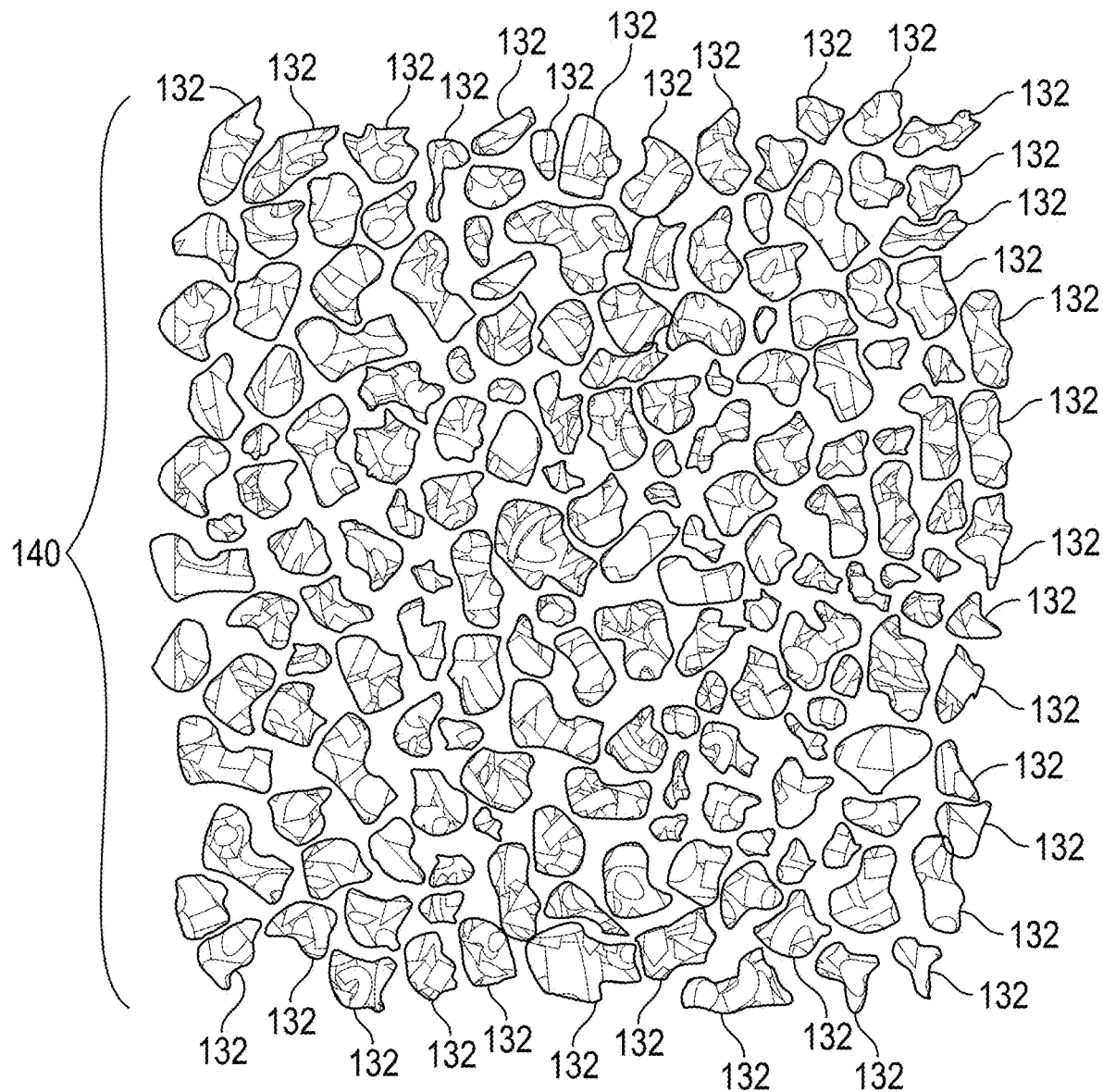
FIG. 1D is a top plan view of a layer of mulch formed from the pellets of FIG. 1C.

Turning to FIG. 1D, the pellets 130 shown in FIG. 1C are broken down, e.g., granularized or crumbled, into crumbled pellets 132 to form a mulch 140, as indicated in step S104 of FIG. 2. As described above, pellets 130 have a substantially regular outer surface such that crumbled pellets 132 also have an outer surface S1 that is substantially regular. In this regard, crumbled pellets 132 are substantially free from surface extensions, e.g., branches, tendrils, or whisps, that may be seen, for example, in fibrous materials such as shells or husks. While several crumbled pellets 132 are indicated and identified in FIG. 1D, it will be understood that, in embodiments, different numbers of crumbled pellets 132 may be provided and in different configurations and/or sizes. In embodiments, crumbled pellets 132 may be produced from ground sawdust 120 with a crushing or crumbling apparatus such as a mill, with one exemplary product being a model TRC1200-36 roller mill which uses 12 inch corrugated rolls (available from CPM Roskamp Champion of Waterloo, Iowa). In embodiments, a different apparatus may be used in producing crumbled pellets 132. Post-processing of pellets 130 to produce crumbled pellets 132 may also include passing crumbled portions of pellets 130 across a screen, one exemplary product being a shaker having a scalping screen size of a No. 3 wire and a sifting screen size of a No. 8 wire (available from BM&M Screening Solutions of Surrey, BC, Canada). In embodiments, different screen sizes and configurations may be used in producing crumbled pellets 132.

Figure 1E:
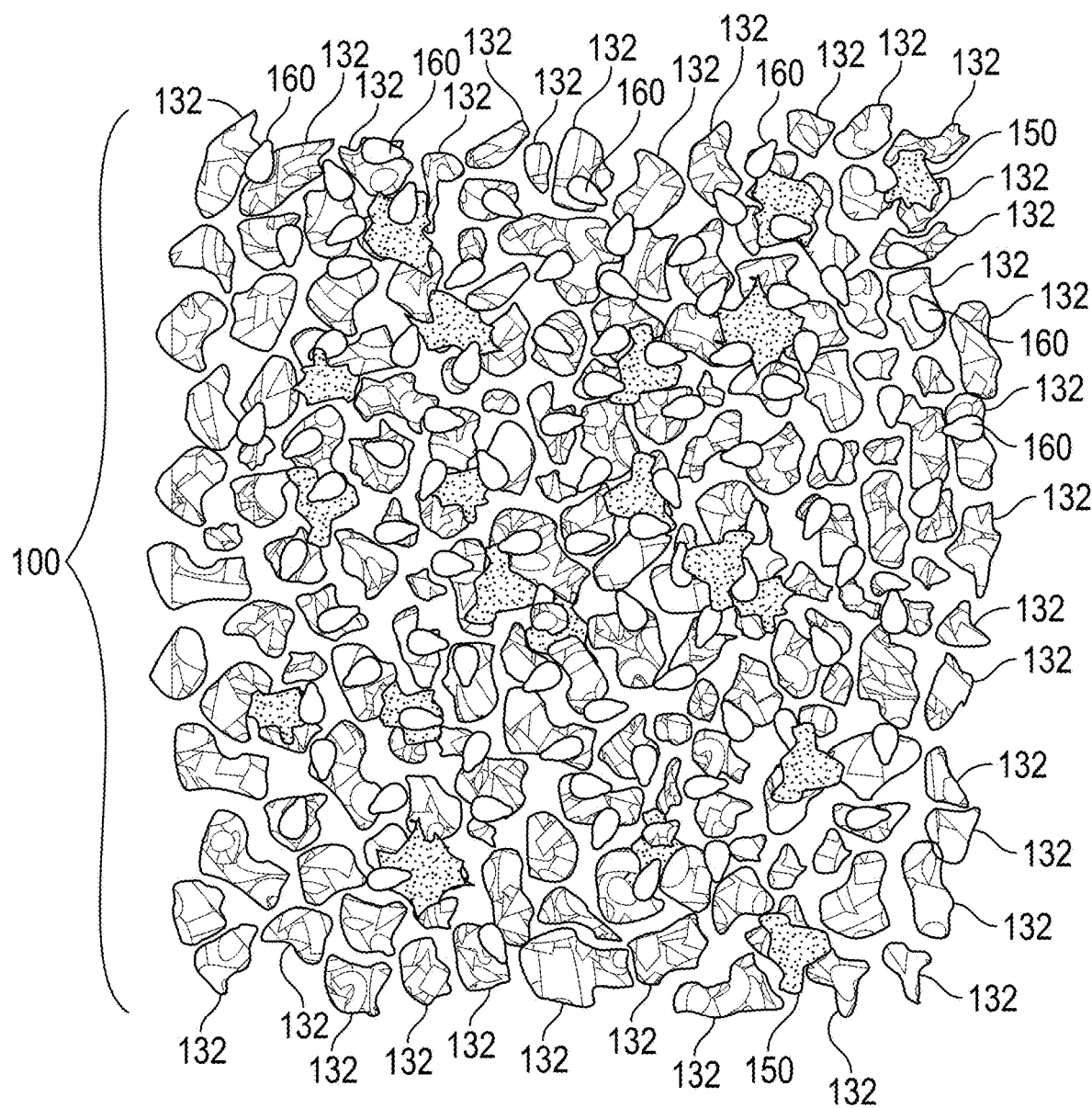
FIG. 1E is a top plan view of a mulch product that includes the mulch of FIG. 1D, grass seed, and fertilizer.

Referring to FIG. 1E, the mulch 140 formed of crumbled pellets 132 shown in FIG. 1D is mixed with a fertilizer 150 and at least one seed 160 to produce a mulch product 100, as indicated in step S105 of FIG. 2. In some embodiments, the fertilizer 150 may be an organic fertilizer, while in other embodiments, the fertilizer 150 may be an inorganic fertilizer. In embodiments, the fertilizer 150 may be UFLEXX® fertilizer (available from Koch Turf & Ornamental of Wichita, Kans.) having Nitrogen in an amount of 46-0-0 and Sulfate of Potassium in an amount of 0-0-50S with a Biodac® filler (available from Kadant GranTek Inc. of Green Bay, Wis.) using a carrier of limestone blended in an amount of 12% N-0% P-3% K. In the mulch product 100, fertilizer 150 may be available in an amount of 1% N-0% P-0% K. In embodiments, fertilizer 150 may be provided in different amounts and configurations.

The seed 160 may be a grass seed, such as, for example, strong creeping red fescue, slender creeping red fescue, chewings fescue, hard fescue, Kentucky bluegrass, and Bermudagrass. In embodiments, different seeds may be used, for example, those use in wild game mixes, flower mixes, and forage mixes. While several crumbled pellets 132, portions of fertilizer 150, and seeds 160 are indicated and identified in FIG. 1D, it will be understood that, in embodiments, different numbers of crumbled pellets 132, portions of fertilizer 150, and seeds 160 may be provided, and each of these may be provided in different configurations and/or sizes. In embodiments, the components of the mulch product 100 may be provided such that the mulch product 100 is, for example, about 84.5% mulch, about 10.5% seed 160, and about 5% fertilizer 150. In embodiments, mulch product 100 may have a different composition, for example, such that the mulch product 100 is about 84.0% mulch, about 11.0% seed 160, and about 5% fertilizer 150; about 84.1% mulch, about 10.9% seed 160, and about 5% fertilizer 150; about 84.2% mulch, about 10.8% seed 160, and about 5% fertilizer 150; about 84.3% mulch, about 10.7% seed 160, and about 5% fertilizer 150; about 84.4% mulch, about 10.6% seed 160, and about 5% fertilizer 150; about 84.6% mulch, about 10.4% seed 160, and about 5% fertilizer 150; about 84.7% mulch, about 10.3% seed 160, and about 5% fertilizer 150; about 84.8% mulch, about 10.2% seed 160, and about 5% fertilizer 150; about 84.9% mulch, about 10.1% seed 160, and about 5% fertilizer 150; or about 85.0% mulch, about 10.0% seed 160, and about 5% fertilizer 150, to name a few.

Figure 3A:
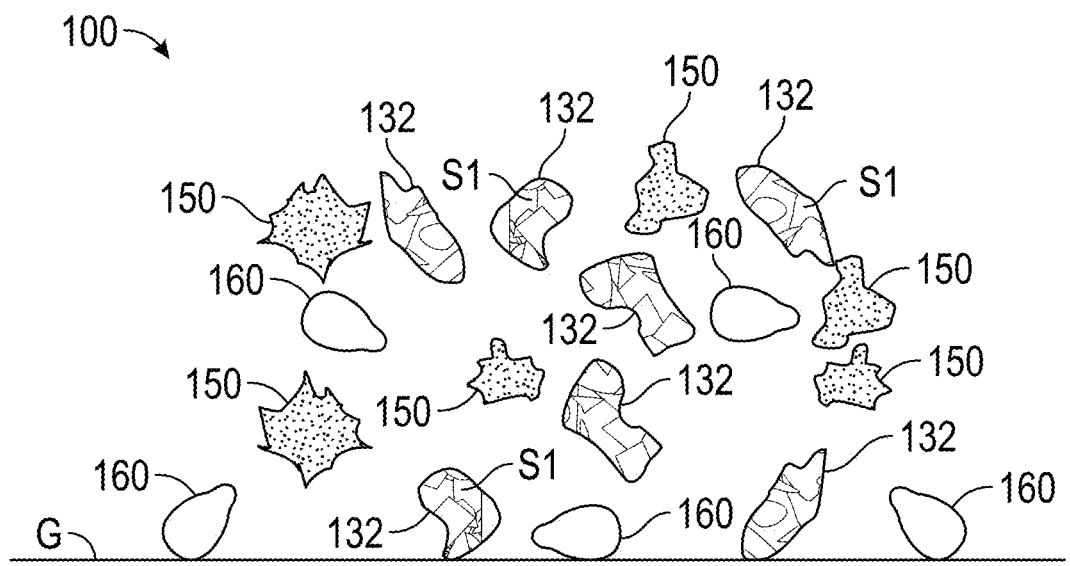
FIG. 3A is a schematic view of the mulch product of FIG. 1E deposited over soil.

In FIG. 3A, an exemplary schematic view of mulch product 100 over soil G is illustrated. A region of mulch product 100 may be deposited over soil G, for example, by a mulch spreader, thrower, or other apparatus (not shown). The substantially regular outer surface S1 of the crumbled pellets 132 of the mulch 140 (FIG. 1D) within mulch product 100, along with fertilizer 150, provides an at least partially porous matrix through which seeds 160 can pass or fall to reach soil G. In this regard, the crumbled pellets 132 of the mulch product 100 have an outer surface S1 that minimizes interference, e.g., blocking, buffering, or other inhibition of the passage of seeds 160 toward soil G upon disposition of the mulch product 100 over soil G.

Figure 3B:
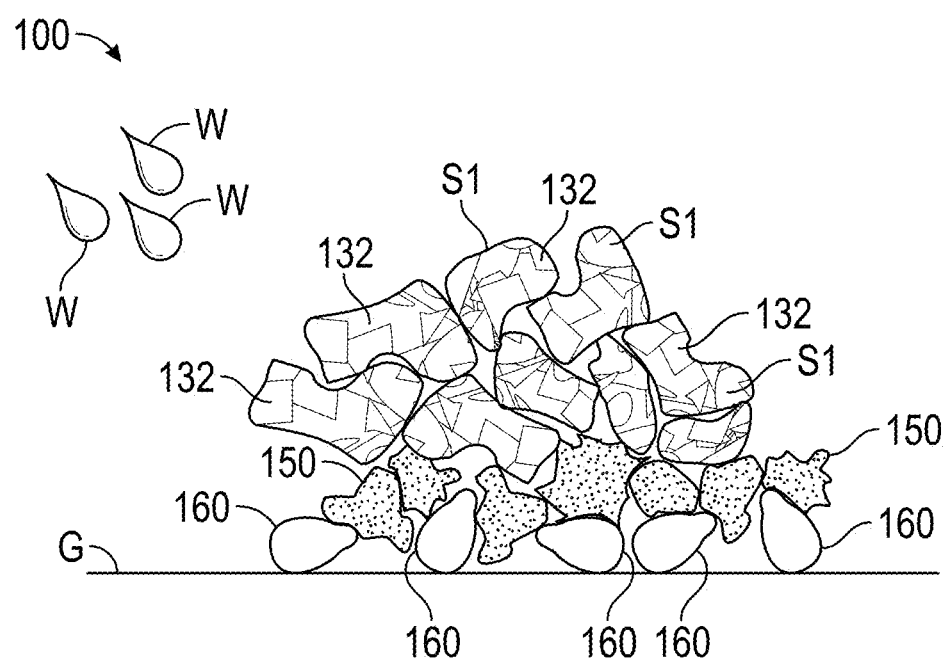
FIG. 3B is a schematic view of the mulch product of FIG. 1E deposited over soil with the mulch expanded from contact with water.
Figure 5A:
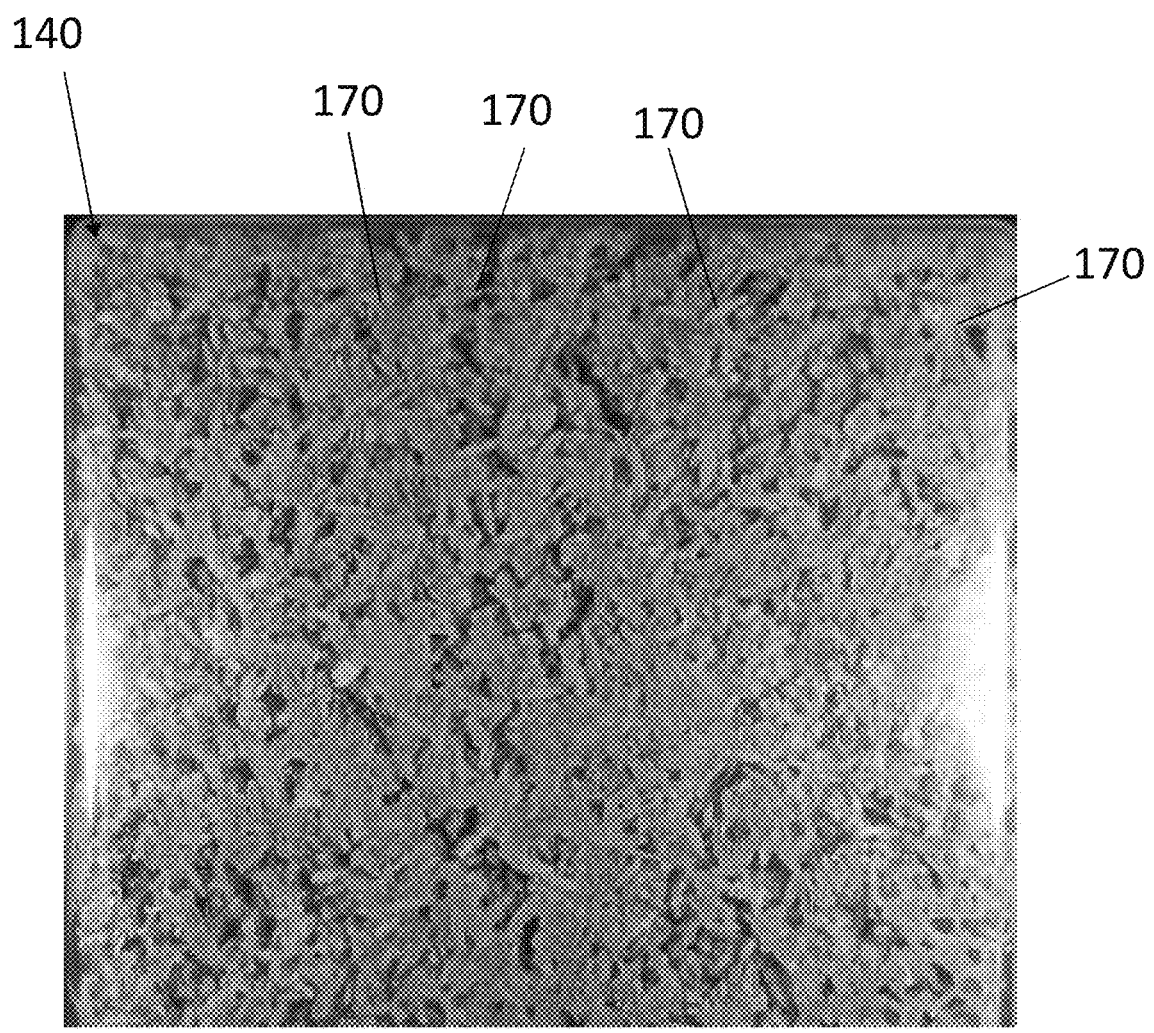
FIG. 5A is a photograph showing the mulch of FIG. 1D mixed with grass seeds.

Referring additionally to FIGS. 3B and 5A, upon contact with water W or another liquid, at least the crumbled pellets 132 of mulch 140 are configured to at least partially absorb water W such that the crumbled pellets 132 expand in volume, for example, such that the density of the crumbled pellets 132 increases up to twice the density of the seeds 160. As shown, due to the substantially regular outer surface S1 of the crumbled pellets 132 of mulch product 100, the crumbled pellets 132 are free to expand in volume with minimal disturbance of the contact of seeds 160 with soil G. In this regard, as the crumbled pellets 132 expand in volume, the crumbled pellets 132 substantially cover the seeds 160 such that the mulch 140 substantially overlies the seeds 160, which can provide a protective cover from environmental elements that may otherwise disturb seeds 160, for example, wind, rain, insects, or animals. In addition, the weight of crumbled pellets 132 upon seeds 160 may also promote contact of the seeds 160 with soil G.

Figure 4A:
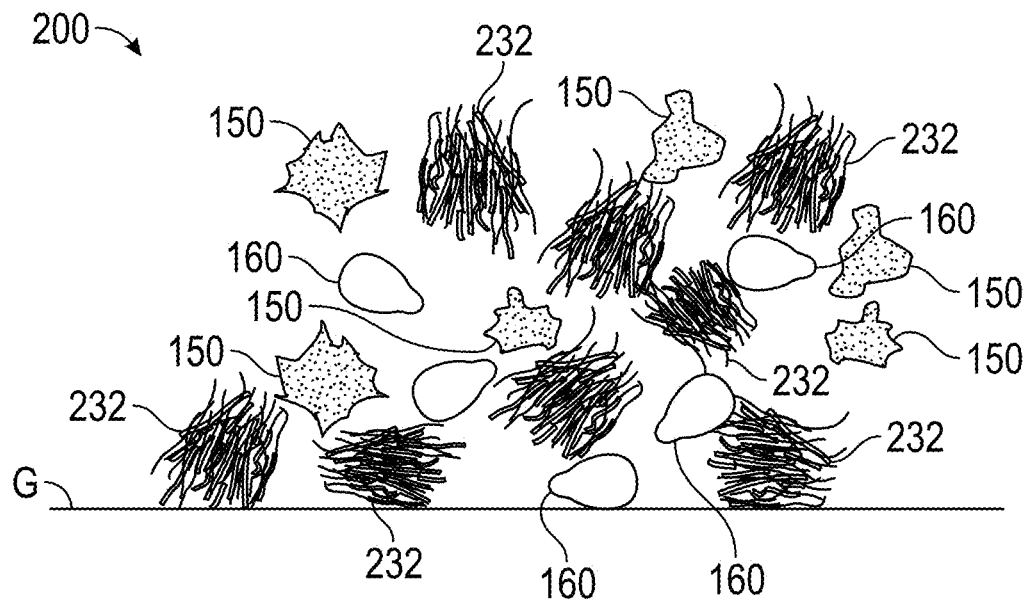
FIG. 4A is a schematic view of a comparative mulch product deposited over soil.

Turning now to FIG. 4A, an exemplary schematic view of a comparative mulch product 200 over soil G is illustrated. The comparative mulch product 200 is described herein to highlight advantages of the mulch product 100 described above. As shown, the comparative mulch product 200 includes at least seeds 160 and a mulch that includes one or more irregular mulch components 232, for example, a fibrous material such as a plant shell or husk. The comparative mulch product 200 may also include fertilizer 150. As illustrated, the irregular mulch components 232 includes a surface that can interfere with the passage of seeds 160 towards soil G such that seeds 160 are inhibited from contact with the soil G by the presence of irregular mulch components 232.

Figure 4B:
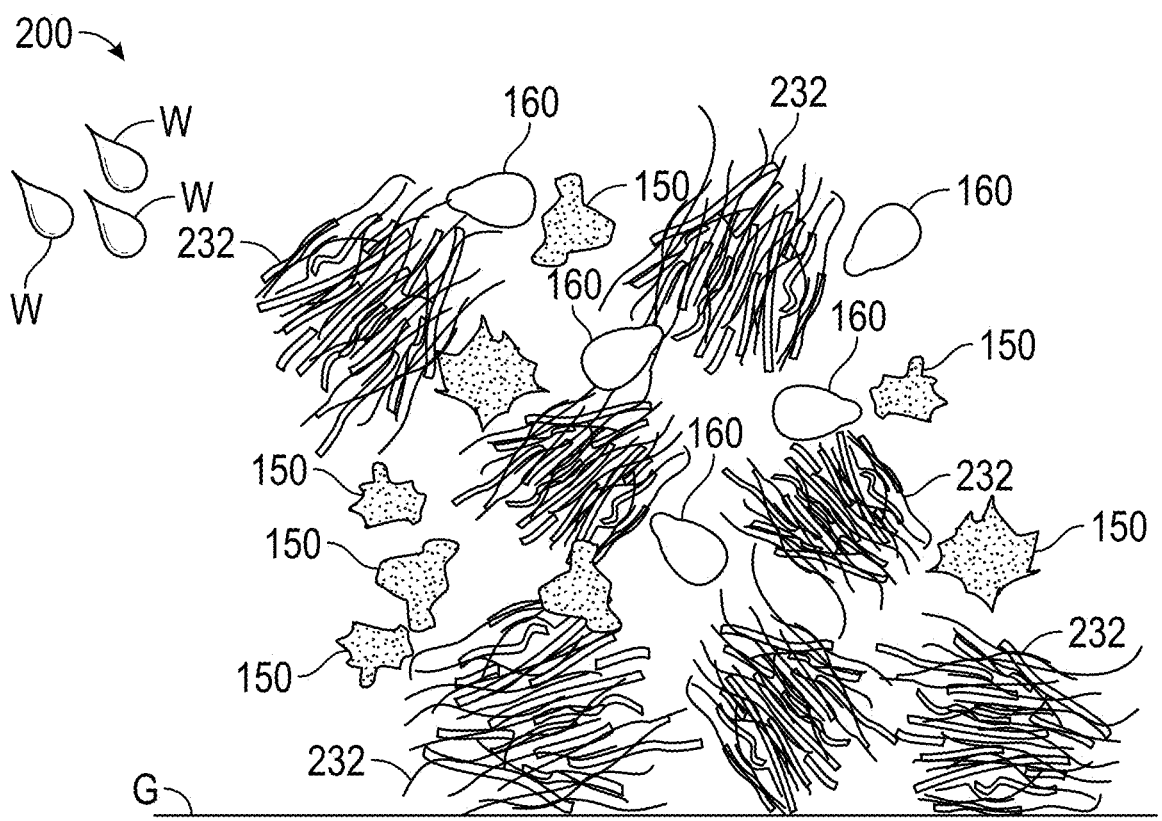
FIG. 4B is a schematic view of a comparative mulch product deposited over soil with the mulch expanded from contact with water.

Referring additionally to FIG. 4B, upon contact with water W or other liquid, the irregular mulch components 232 generally increase in volume in an irregular manner, e.g., in a branching or interlocking manner, such that the components 232 interfere with the seeds 160 and cause the seeds 160 to lift away from the soil G. To the extent that any seeds 160 had been previously in contact with soil G, the irregular mulch components 232 may at least partially underlie such seeds 160, or at least partially dislodge or disturb seeds 160, and lift the seeds 160 away from the soil G upon swelling of the irregular mulch components 232.

In contrast, as described herein, the mulch product 100 (FIG. 3A) includes crumbled pellets 132 having an outer surface S1 that allows and promotes soil contact for seeds 160 as compared to comparative mulch products, e.g., mulch product 200.

Mulch Particle Study

An exemplary mulch particle study was conducted at NexGen Turf Research LLC, facility in Albany, Oreg. (44° 33′N, 123° 08′N) to determine the particle size of different mulch products. The study consisted of four entries:
1. Mulch 140 (FIG. 1D)
2. Mulch from Pennington® One Step Complete™ combination mulch, seed, and fertilizer (sold commercially by Pennington Seed, Inc. of Madison, Ga.).
3. Mulch from Scotts® EZ Seed® combination mulch, seed, and fertilizer (sold commercially by The Scotts Miracle-Gro Company of Marysville, Ohio).
4. Mulch from Vigoro® Certain Seed® combination mulch, seed, and fertilizer (sold commercially by the Home Depot Product Authority, LLC of Atlanta, Ga.).

The composition of the mulch is described below in Table 1:

TABLE 1

| Mulch Compositions | |
| --- | --- |
| Product | Mulch Material |
| Mulch 140 | crumbled wood pellets from particles/dust |
| Mulch from Pennington ® One Step Complete ™ | finely divided paper & wood |
| Mulch from Scotts ® EZ Seed ® | coir pith fiber |
| Mulch from Vigoro ® Certain Seed ® | premium coco coir |

For each product, 908 g of mulch was used and any seed or fertilizer mixed with the mulch was hand separated, so that only the mulch was used in this study. The particle size weights were based on the weight of 1 cup (8 fl. oz.) of mulch. The average weight was calculated from 10, 1-cup samples, detailed below in Table 2.

TABLE 2

| Mulch Weights 1 Cup Mulch | |
| --- | --- |
| Rep | Weight g |
| 1 | 124.581 |
| 2 | 128.237 |
| 3 | 119.424 |
| 4 | 131.245 |
| 5 | 122.794 |
| 6 | 126.343 |
| 7 | 125.058 |
| 8 | 127.035 |
| 9 | 118.945 |
| 10 | 124.338 |
| AVG | 124.8 |

Particle size distribution was determined for each entry by running a 124.8 g sample, for 60 seconds, through nine (9) sieves in a RX-812/B Dura TAP™ Testing Sieve Shaker (available from the Seeburo® Equipment Co. of Des Plaines, Ill.). For each entry, eight samples of 124.8 g were weighed on a FX-300 A&D Electronic Balance (available from A&D Instruments Ltd. of Abingdon, UK). The test was replicated eight times for each entry. The nine sieves (screens) that were used are detailed in Table 3 below.

TABLE 3

| Screens | |
| --- | --- |
| Screen Number | Screen Size mm |
| NO4 | 4.75 |
| NO5 | 4.00 |
| NO6 | 3.35 |
| NO7 | 2.80 |
| NO8 | 2.36 |
| NO10 | 2.00 |

TABLE 3-continued

Screens

| Screen Number | Screen Size mm |
|---|---|
| NO12 | 1.70 |
| NO14 | 1.40 |
| NO16 | 1.18 |
| Bottom | 0.0 |

Results

Figure 6:
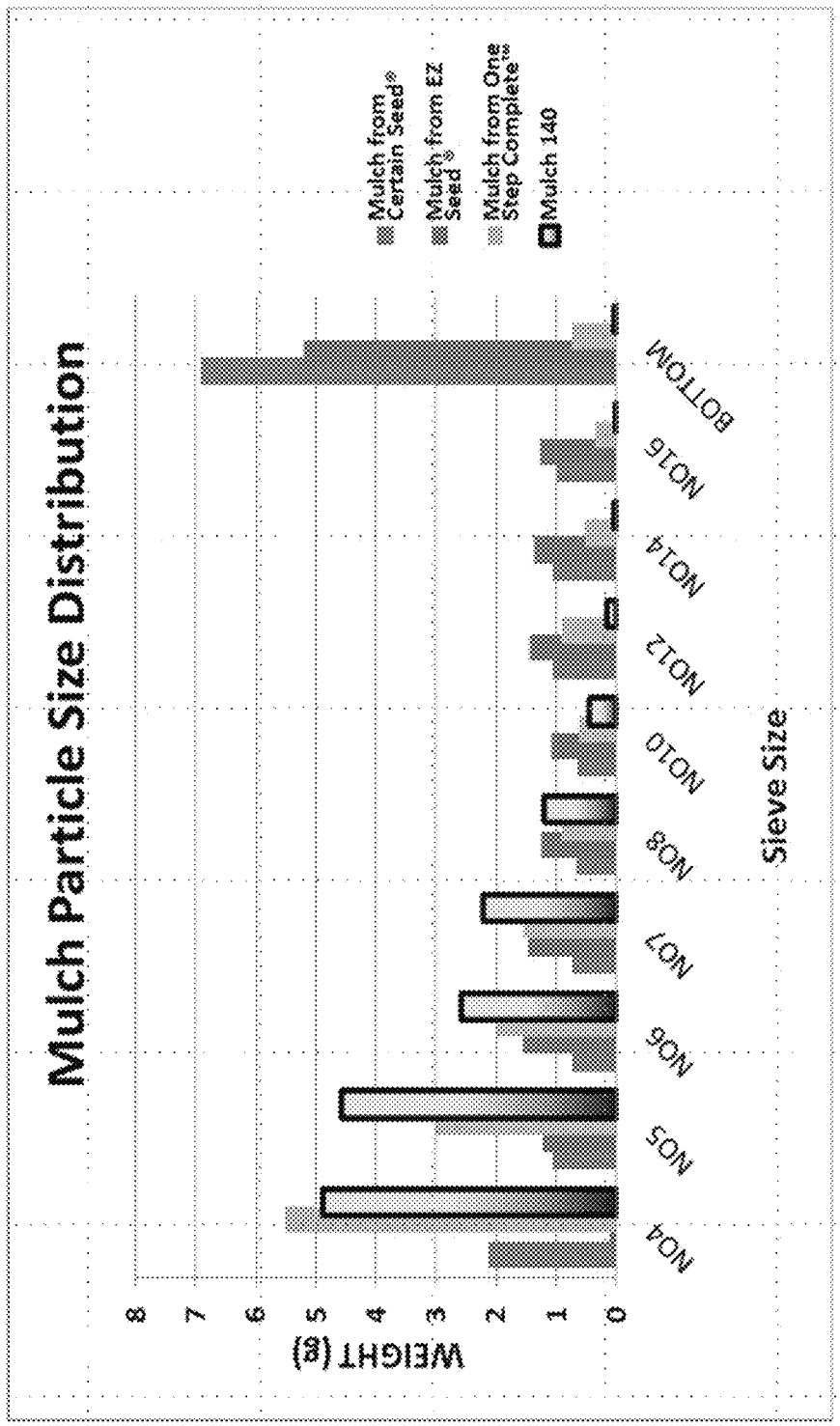
FIG. 6 is a chart illustrating the results of a mulch particle size study.

The Mulch Particle Size Study results are shown in FIG. 6 and in the following Table 4:

TABLE 4

Mulch Particle Size Study Results

| PRODUCT | NO4 | NO5 | NO6 | NO7 | NO8 | NO10 | NO12 | NO14 | NO16 | BOTTOM |
|---|---|---|---|---|---|---|---|---|---|---|
| Mulch from Certain Seed® | 2.12538 | 1.06013 | 0.73675 | 0.74738 | 0.68013 | 0.65513 | 1.06025 | 1.05850 | 0.97700 | 6.93100 |
| Mulch from EZ Seed® | 0.11850 | 1.22913 | 1.56638 | 1.47238 | 1.26638 | 1.08488 | 1.45525 | 1.36863 | 1.28663 | 5.21663 |
| Mulch from Pennington® One Step Complete™ | 5.51025 | 3.01038 | 1.98738 | 1.54775 | 0.91275 | 0.62400 | 0.92588 | 0.51788 | 0.35900 | 0.73450 |
| Mulch 140 | 4.88638 | 4.57275 | 2.58350 | 2.23425 | 1.19838 | 0.45250 | 0.16375 | 0.04163 | 0.02325 | 0.03650 |
| CV[1] | 22.65988 | 18.58984 | 14.46528 | 16.17533 | 19.12007 | 29.03411 | 10.51656 | 13.61404 | 12.42711 | 24.47638 |
| LSD[2] | 0.61610 | 0.39475 | 0.21388 | 0.20881 | 0.16687 | 0.17589 | 0.08155 | 0.08746 | 0.07072 | 0.68013 |

[1]CV (coefficient of variation) is a standardized measure of dispersion of a probability distribution or frequency distribution that is often expressed as a percentage and defined as the ratio of the standard deviation σ to the mean μ (or its absolute value, |μ|).
CV shows the extent of variability in relation to the mean of the population.
[2]LSD (Least Significant Difference) is a statistic that allows for any comparison between two treatment means to be assessed for statistical significance. If the difference between any two is greater than the LSD, then that difference is declared to be significant.

From FIG. 6 and the subset table (Table 5) presented below, the results show that each mulch in the study had a unique particle size signature. The particle size of mulch 140 was higher than the other tested mulches at several sieve sizes. Additionally, in terms of the Bottom Pan weights, mulch 140 had less dust than other tested mulches. Generally, more dust equates to less stability of product on the soil because, due to its very small particle size, dust is more prone to being disturbed, for example by air movement (e.g., because it dries quickly), or by washing away with water. Accordingly, mulch 140 is more stable than comparative mulches such that constituent components of mulch 140 tend to remain undisturbed in the presence of environmental conditions, for example, wind and water.

The following Subset Table, Table 5 was excerpted from the Mulch Particle Size Study above:

Seed/Contact Study

A Seed/Soil Contact Study was conducted to determine the actual number of seeds that make contact with the soil in the different types of mulch. 500 seeds of tall fescue [Rebel V (ATF1736)], indicated as 170, were counted for each replication of this study.

Figure 5B:
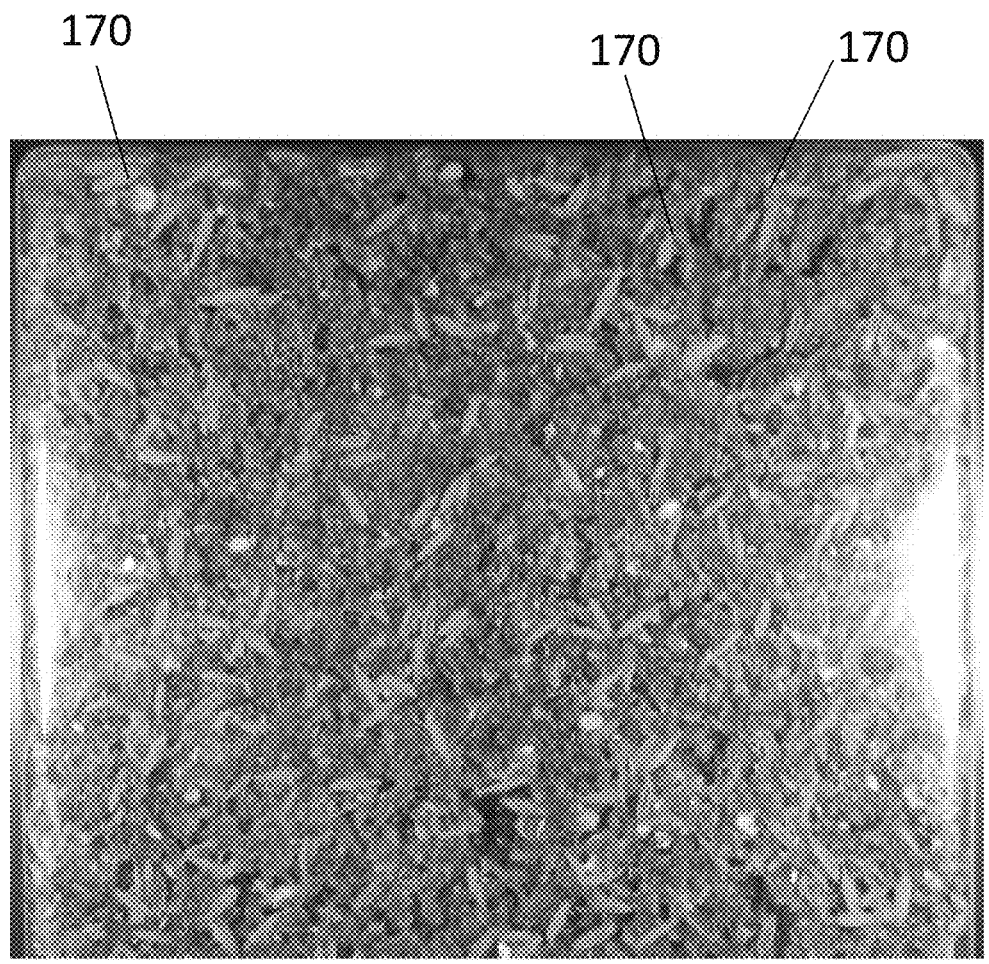
FIG. 5B is a photograph showing a comparative mulch mixed with grass seeds.
Figure 5C:
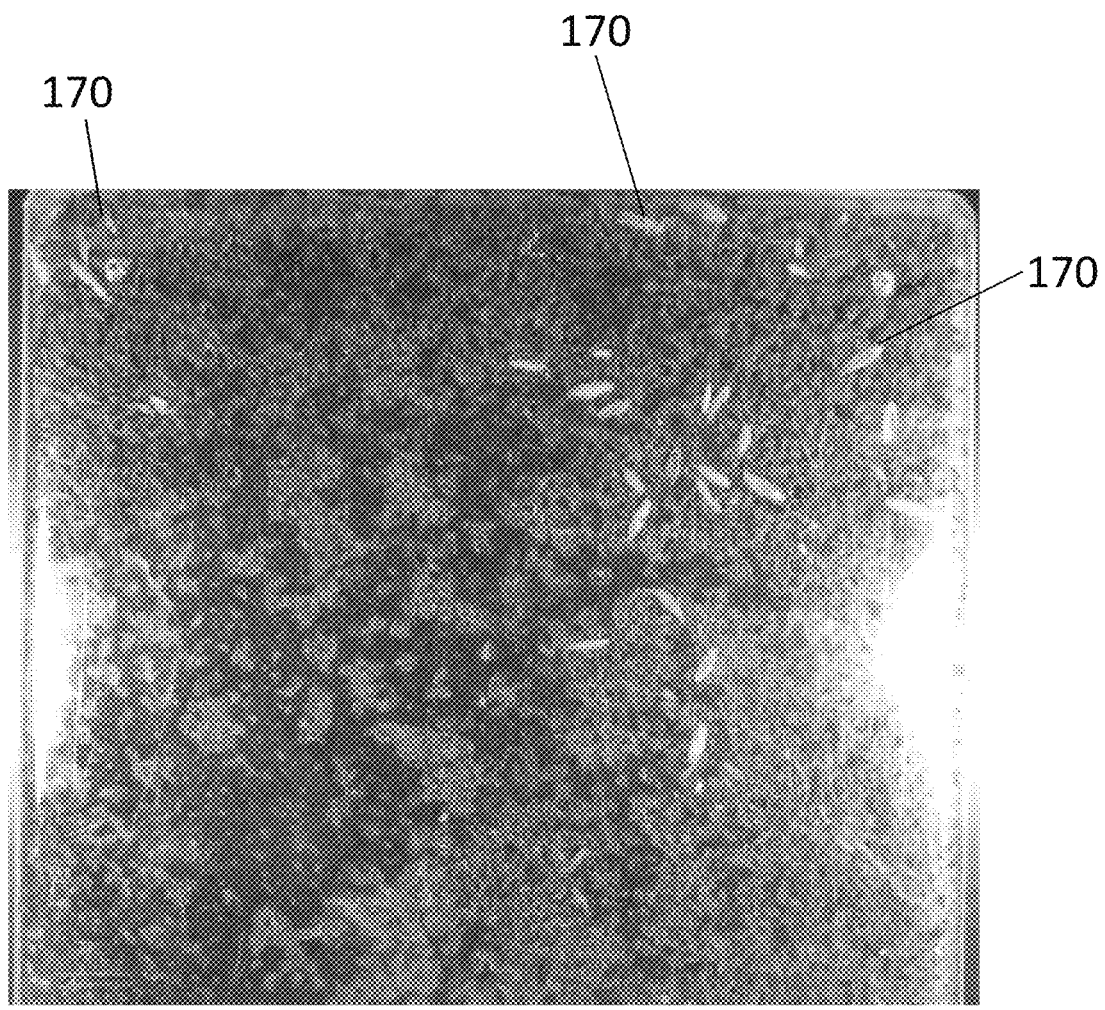
FIG. 5C is a photograph showing a comparative mulch mixed with grass seeds.
Figure 5D:
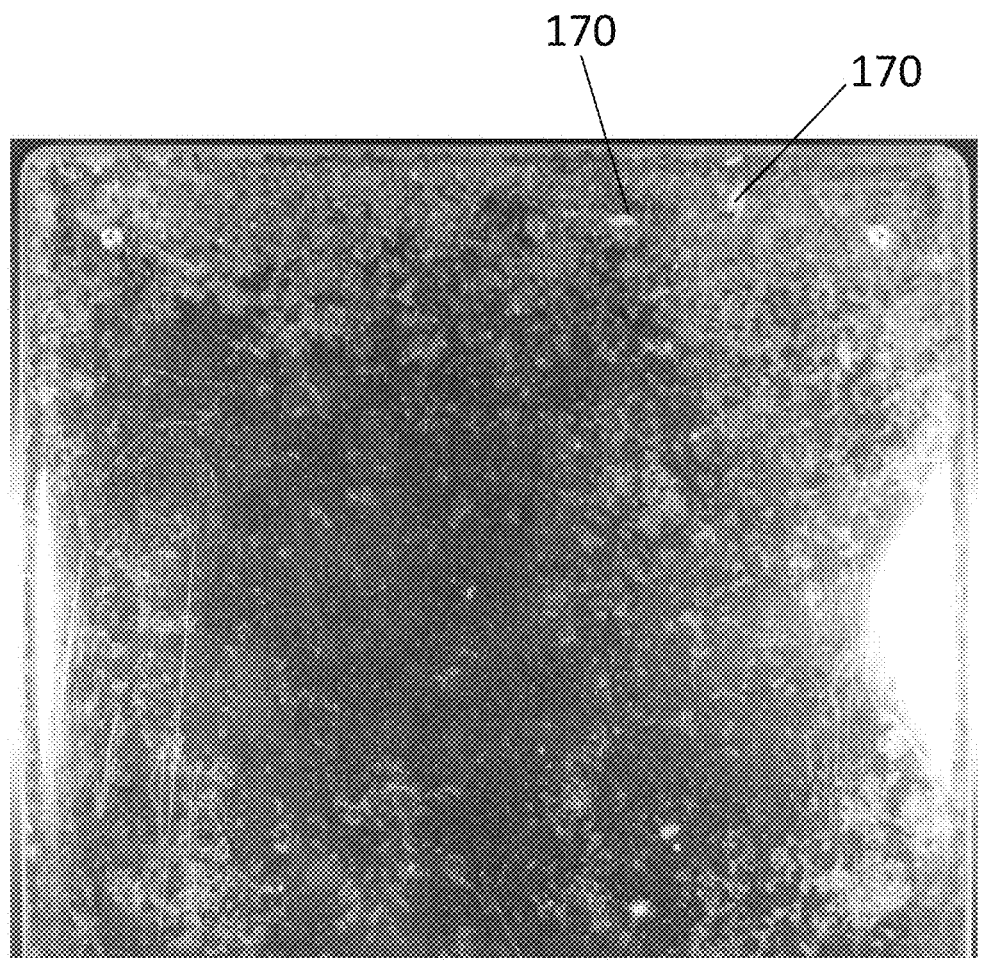
FIG. 5D is a photograph showing a comparative mulch mixed with grass seeds.

The study consisted of four entries:
1. Mulch 140 with seeds 170 (shown in FIG. 5A)
2. Mulch from Pennington® One Step Complete™ with seeds 170 (shown in FIG. 5B)
3. Mulch from Scotts® EZ Seed® with seeds 170 (shown in FIG. 5C)
4. Mulch from Vigoro® Certain Seed® with seeds 170 (shown in FIG. 5D)

Each count was replicated 6 times per entry. The seeds 170 were sprayed with fluorescent orange paint to aid in counting of seeds 170 in the mulch. Two acrylic lids from a small germination box were used in the study. The lids had an area of 17.53 in2 and were 0.25" deep. Based on a mulch application rate of 1 cup (124.8 g)/1 ft2, was calculated that 15.2 g of mulch was needed to cover 17.53 in2. Six samples of mulch were weighed out of each entry. Then, the 500 fluorescent seeds 170 were thoroughly mixed into each sample. The mulch/seed mixture was spread evenly on the lid and 100 ml of water was added to the mulch/seed mixture, then a second acrylic lid as placed over the mulch/seed mixture. The lids were then flipped over and the number of seeds 170 that were on the bottom lid was counted, representing the number of seeds 170 that would make contact with the soil.

TABLE 5

Subset Table

| PRODUCT | NO4 | NO5 | NO6 | NO7 | NO8 | NO10 | NO12 | NO14 | NO16 | BOTTOM |
|---|---|---|---|---|---|---|---|---|---|---|
| Mulch 140 | 4.886[†] | 4.573[‡] | 2.584[‡] | 2.234[‡] | 1.198[‡] | 0.453 | 0.164[†] | 0.042[†] | 0.023[†] | 0.037[†] |
| Mulch from One Step Complete™ | 5.510 | 3.010 | 1.987 | 1.548 | 0.913 | 0.624 | 0.926 | 0.518 | 0.359 | 0.735 |
| CV | 22.660 | 18.590 | 14.465 | 16.175 | 19.120 | 29.034 | 10.517 | 13.614 | 12.427 | 24.476 |
| LSD | 0.616 | 0.395 | 0.214 | 0.209 | 0.167 | 0.176 | 0.082 | 0.087 | 0.071 | 0.680 |

[‡]significantly more
[†]significantly less

Results

The Seed/Soil Contact Study results are shown in the Table 6 below:

TABLE 6

Seed/Soil Contact Study
Seed/Soil Contact Study

| PRODUCT | Test 1* | Test 2* | AVG | Separation Class | AVG % Seed |
|---|---|---|---|---|---|
| Mulch 140 and seeds 170 | 230.00 | 264.67 | 247.33 | A | 49.47 |
| Mulch from One Step Complete ™ and seeds 170 | 122.67 | 181.00 | 151.83 | B | 30.37 |
| Mulch from EZ Seed ® and seeds 170 | 38.33 | 12.67 | 25.50 | C | 5.10 |
| Mulch from Certain Seed ® and seeds 170 | 3.67 | 2.00 | 2.83 | D | 0.57 |
| CV | 11.34 | 9.62 | 8.79 | | |
| LSD | 17.75 | 17.56 | 14.90 | | |
| MIN. MEAN | 3.67 | 2.00 | 2.83 | | |
| MAX. MEAN | 230.00 | 264.67 | 247.33 | | |

*3 reps

As shown, mulch 140 was shown with a significant number of seeds 170 in contact with reference to the other entries in the study. A high seed/soil contact of mulch 140 is provided, at least in part, by the substantially regular outer surface S1 of the crumbled pellets 132 of mulch 140, as described above (shown best in FIGS. 3A and 3B).

Bulk Density Study

Bulk density evaluations were also carried out on four separate mulch and seed treatments: Mulch from Pennington® One Step Complete™ and seed, mulch 140 (FIG. 1D) and seed, mulch from Scotts® EZ Seed® Sun and Shade and seed, and Tall Fescue (sold commercially by Pennington Seed Inc. of Madison, Ga.). These evaluations of each of the four treatments were repeated for five replications of each treatment. Evaluations were based on methods described by Niedziela and Nelson (Niedziela, Carl E., and Paul V. Nelson. "A rapid method for determining physical properties of undisturbed substrate." HortScience 27.12 (1992): 1279-1280, which publication is incorporated by reference herein as if repeated in its entirety). Samples were evaluated at moisture levels present upon removal from packaging, without saturation. Plastic pots (height 8.5 cm, top diameter 11.3 cm, bottom diameter 9 cm) were used to contain each treatment and were obtained from ITML Horticultural Products Inc., Brantford, Ontario, Canada. Drainage holes on the bottom of the pots were sealed to prevent any loss of the mulch/seed mixture. Individual pots were filled with pre-weighed amounts of their respective treatments (mulch 140 and seed at 280 g, Pennington® One Step Complete™ at 165 g, Scotts® EZ Seed® Sun and Shade and seed at 195 g, and Tall Fescue at 190 g.

A circular plywood disc (10.2 cm diameter) was used to compress the top of each sample 1.4 cm below the top of the pot to a final volume of 500 cm³. Samples were transferred into drying containers, dried at 87° C. for 93.5 hours and then reweighed. Bulk density was calculated using the compressed volume and final dry weight of each sample.

Results

The bulk density results are shown in the Table 7 below:

TABLE 7

| | Bulk Density | | |
|---|---|---|---|
| | Bulk density | | LSD |
| Product | g/cc | lb/ft³ | group |
| Tall Fescue | 0.330 | 20.6 | C |
| Mulch from Sun and Shade and seed | 0.353 | 22.0 | B |
| Mulch from One Step Complete ™ and seed | 0.314 | 19.6 | D |
| Mulch 140 and seed | 0.532 | 33.2 | A |
| | 0.010 | 0.59 | |

Mulch 140 was observed to have a higher bulk density that any of other entries tested. Bulk density is the density of just the solid part of a mulch and does not include any pore space. In the case of mulch 140, the bulk density is the density of the crumbled pellets 132. The data on bulk density combined with the particle size and seed/soil contact data shows that the unique combination of reduced or no dust, a high bulk density, and a higher pore space (due to very low amounts of dust size particles) produces a mulch product that enables a higher number of seeds to contact the soil, thus providing an environment for seed germination and establishment. Thus, as fewer seeds are lost in the mulch matrix with mulch 140, fewer seeds are prevented from reaching the soil.

The above examples are in no way intended to limit the scope of the present invention. It will be understood by those skilled in the art that while the present disclosure has been discussed above with reference to exemplary embodiments, various additions, modifications and changes can be made thereto without departing from the spirit and scope of the invention as set forth in the claims.

What is claimed is:

1. A mulch product, comprising:
 a fertilizer;
 at least one seed; and
 a mulch comprising a plurality of crumbled wood pellets, each crumbled wood pellet comprising ground sawdust and having a substantially regular outer surface that minimizes engagement with the at least one seed, the crumbled wood pellets have a bulk density of about 33.2 lb/ft³.

2. The mulch product of claim 1, wherein the at least one seed is a grass seed.

3. The mulch product of claim 1, wherein the mulch forms about 84.5% of the mulch product, the fertilizer forms about 5% of the mulch product, and the at least one seed forms about 10.5% of the mulch product.

4. The mulch product of claim 1, wherein the outer surface of the respective crumbled wood pellets is substantially free from surface extensions.

5. The mulch product of claim 1, wherein the ground sawdust comprises raw sawdust.

6. The mulch product of claim 5, wherein the raw sawdust comprises wood.

7. A method of producing a mulch product, comprising:
obtaining ground sawdust;
forming pellets from the ground sawdust;
crumbling the pellets into a mulch, the pellets being crumbled to have a substantially regular outer surface and such that each pellet comprises ground sawdust and such that the crumbled wood pellets have a bulk density of about 33.2 lb/ft$^3$; and
mixing the mulch with at least one seed and a fertilizer.

8. The method of claim 7, wherein the ground sawdust is ground from raw wood sawdust.

9. The method of claim 7, wherein forming of the pellets comprises applying direct pressure to the ground sawdust.

10. The method of claim 7, wherein the at least one seed is a grass seed.

11. The method of claim 7, wherein the mulch forms about 84.5% of the mulch product, the fertilizer forms about 5% of the mulch product, and the at least one seed forms about 10.5% of the mulch product.

12. A mulch product formed by the process of:
obtaining ground sawdust;
forming pellets from the ground sawdust; and
crumbling the pellets into a mulch product and such that the crumbled pellets each have a substantially regular outer surface and each comprise the ground sawdust, the crumbled pellets have a bulk density of about 33.2 lb/ft$^3$,
the mulch product comprises the crumbled pellets, a fertilizer, and at least one seed.

13. The mulch product of claim 12, wherein the at least one seed is a grass seed.

14. The mulch product of claim 12, wherein the mulch forms about 84.5% of the mulch product, the fertilizer forms about 5% of the mulch product, and the at least one seed forms about 10.5% of the mulch product.

15. The mulch product of claim 12, wherein the ground sawdust comprises raw sawdust.

16. The mulch product of claim 15, wherein the raw sawdust comprises wood.

17. The mulch product of claim 12, wherein the outer surface of the respective crumbled wood pellets is substantially free from surface extensions.

\* \* \* \* \*